INVENTORS
Reuben Stanley Smith
James L. Adams, Jr.
BY
Erwin, Wheeler & Woolard
ATTORNEYS Patented Apr. 3, 1923.

1,450,339

UNITED STATES PATENT OFFICE.

REUBEN STANLEY SMITH AND JAMES L. ADAMS, JR., OF MILWAUKEE, WISCONSIN, ASSIGNORS TO A. O. SMITH CORPORATION, OF MILWAUKEE, WISCONSIN, A CORPORATION OF NEW YORK.

INTERMITTINGLY-OPERATING MOTOR SET.

Application filed August 4, 1919. Serial No. 315,189.

*To all whom it may concern:*

Be it known that we, REUBEN STANLEY SMITH and JAMES L. ADAMS, Jr., citizens of the United States, and residing in the city of Milwaukee, county of Milwaukee, and State of Wisconsin, have invented a new and useful Improvement in Intermittingly-Operating Motor Sets; and we do declare that the following is a full, clear, and exact description thereof, such as will enable persons skilled in the art to which the invention pertains to make and use the same, reference being had to the drawings hereto attached and forming part of our specification for disclosure as to certain details of construction and operation.

This invention is constituted of a novel varying-speed generator and motor set, in which a plurality of alternately-operating varying-speed electric motors is employed. The plurality of generators which supply electric current to the motors are driven continuously but at varying speeds. For brief periods, in the performance of the function which it is designed to accomplish, the motor supplied with current from its respective generator is in operation at a maximum speed. For the intervening periods, likewise brief and of the same time-length, the motor is in a position of rest.

Broadly stated, our invention resides in the means employed for, and has reference to, the driving of an assemblage of machines, such as may be sub-divided into a plurality of groups, the machines of each group operating independently, intermittingly, and alternately, with relation to the machines of the other group or groups, such driving means constituting an arrangement whereby two or more electric motors can be driven periodically, in recurrent cycles each of predetermined duration, in such a manner that the working periods of the active motors will alternate with those of the motors which for the moment are inactive. In the embodiment of the invention in the form hereinafter described, the cycle of operation is divided, for the purposes of illustration, into two parts, each of which may be approximately of the same duration.

By way of explanation of the purposes in producing the present invention, it may be stated that in application Serial No. 212,934, filed January 21, 1918, by R. Stanley Smith, one of the present inventors, upon which Patent No. 1,397,020, was granted November 15, 1921, to which reference may be had, there is disclosed an assemblage, the several machines of which by their connected and related movements perform in succession the series of operations involved in the conversion of metal sheets or plates or blanks into a completed and unitary frame for an automobile or other vehicle.

The assemblage referred to comprises machines which have for their dependent and related functions, among others, the punching of blanks from metal sheets or plates to form the side and end and cross bars of an automobile frame, piercing such blanks at predetermined places for the accommodation of the rivets employed to unite in one structure the several parts of the frame, shaping the blanks by flanging or offsetting so that the side and end and cross bars will have the necessary degree or rigidity, attaching brackets and gussets, machining or milling the several parts as required, assembling and clamping in correct relation the elements of the frame, inserting rivets, and riveting the assembled parts together while clamped in their respective positions, so that a completed automobile or other frame is produced in its entirety and as a unitary structure by the operation of wholly automatic mechanical devices.

The assemblage may be likened to a railway system, which is constituted of a number of stations, at each of which will be placed one or more machines of appropriate type, the type of machines employed at each station and the number thereof being determined by the nature and volume of the particular work to be performed at such station. For instance, a single blanking press at one station will be ample for the production of blanks to form the right hand side bars, to the full capacity of the assemblage, in which there will be, at the same station, a complemental left hand side bar blanking press. Or, a single blanking press for producing both right and left hand side bar blanks may be employed. But it will be necessary, for example, to install a plurality of riveting machines at the riveting station, for the reason that the number of rivets used is comparatively large. Again the rivets are so distributed that some of them must unavoidably be in such proximity and in planes other than that in which a plurality of single riveting machines can be adjusted for synchronous operation. Where a plurality of machines is employed at one station, all of such machines will be adjusted within the limits of space for simultaneous operation, when it is possible to do so, so as to avoid a further sub-division of the operation to be performed at that particular station.

In the foregoing, we have referred to the various machines employed in the assemblage, that is, the machines which perform the succession of mechanical operations or work movements incident to the conversion of metal sheets or plates into a completed automobile or other frame. The said mechanical operations or work movements constitute but one series of the two distinct and independent series of movements residing in the assemblage. A second series of movements taking place within the assemblage is composed of the conveyor movements, by means of which the metal sheets or plates, or the blanks or parts in whatever stage of treatment or degree of completion, are conveyed from station to station, or from machine to machine at such stations as require more than a single machine for the performance of the work assigned to that particular station.

The devices of the present invention have for their purpose the achievement of the two sets of movements referred to, namely, "the work movement" whereby the machines at all of the stations forming one line of group of the assemblage are operated simultaneously to perform the task allotted to each of them, and "the conveyor movement" whereby the materials being operated upon are conveyed simultaneously from station to station, or otherwise shifted as to position, by the devices forming the other line or group of the assemblage, in accordance with the requirements pertaining to the work to be performed at each particular station.

The two separate sets of movements above outlined are produced in timed and regular alternation. The time within which the two movements are to be completed constitutes a cycle which is sub-divided into periods of work and into periods of rest, for both the work devices and the conveyor devices. By thus sub-dividing the cycle of time within which all of the operating parts must complete their functions, and operating in synchronism all of the mechanisms, either work or conveyor, which have been set for operation during the period of sub-division, we are enabled to turn out completed automobile or other vehicle frames on a schedule providing for the production of a given number of frames per minute.

In so far as the present invention is applicable to the assemblage above described, we will say that the several machines and devices of the two lines which alternately participate in the two separate sets or series of movements, both work and conveyor, referred to, are each independently equipped with an electric motor, which is operated at a varying speed. All of the motors constituting one line or group which perform one of the said separate sets or series of movements operate synchronously. This is true also with regard to the operatiton of the motors of the line or group for the other separate series of movements. When driving the machine or conveyor device connected to it for operation, the motor moves at its maximum speed, but upon completion of the operation the motor comes to a position of rest. If the work machine be in operation, the conveyor device will be at rest; and conversely, if the conveyor device be in action, the work machine will be at rest. The motors of one set are always at rest while the motors of the other set are in operation, barring the brief space of time required for transition of the motors from action to inaction, and vice versa; and during this brief space of time there is a momentary concurrent but resultless movement of all of the motors of both sets.

To produce this intermitting action of the motors, we have devised a generating set containing one or more generators, which preferably, but not necessarily, are of the alternating current type, and which are driven at varying speeds in re-current cycles of predetermined time length each. When of the alternating current type, these machines generate one or more currents of varying frequency, and where there is a plurality of generators so operating, the latter are so timed by means of appropriate gearing, or other equivalent device, that their periodically re-curring maxima of frequency, alternate with each other, or at least do not occur at the same instant, in the several generators. The maxima of frequency produced by each generator recur at uniformly timed intervals, with the minima lying at instants half-way between said maxima, or approximately so. These varying frequency currents when transmitted to the motor, or motors, as the case may be, serve to operate it, or them, at the varying speeds mentioned, and in a manner which will presently be described.

Where the above generating set comprises two generators, one of these is designed to supply current for the motors of the machines which perform the several mechanical operations or work movements, and the other to supply current for the motors of the conveyor devices. A constant speed motor is employed to drive the generators, the connection between the driving motor and each generator being such that an accelerated motion is imparted to the generator during certain timed periods, to produce an alternating current of maximum frequency, while during the intervening periods the generator will be operated at its lowest speed, and so produce a current of minimum frequency, the transition from high speed to low speed, and vice versa, being quickly accomplished.

To effect this variation in the speed of the generators, we make use of an arrangement of gears including intermeshing irregular or eccentric gears, in each connection from the driving motor, such irregular gears being so proportioned as to transmit the desired fast and slow motions to the generators. When operating at their greatest velocity, the generators will produce, for instance, a 60-cycle alternating current, during which period the active motors of the assemblage will be driven to the performance of their work. With the completion of the operation, the velocity of the generators will be reduced to the lowest point, at which time, say, a 30-cycle alternating current will be produced, and the machines or conveyor devices previously in action will be brought to a position of rest upon the completion of their portion of the cycle of movement. The periodic inaction of the machines and conveyor devices referred to, is due to the fact that their actuating motors cease to operate when the frequency of the electrical current is reduced to the minimum, as will be described.

According to our invention, we drive the electric motors of the work machines and conveyor devices of the assembly intermittingly by supplying one element of the motor with a current of constant or fixed frequency, or approximately so, and supplying the other element of the motor with a current of varying frequency, which ranges from the minimum to the maximum, as before stated. The current of constant frequency fed to the first element of the motor, should preferably, but not necessarily, have a frequency which is equal to the minimum frequency of the current fed to the second element of the motor.

In carrying out our invention, we prefer to use induction motors with distributed windings on both elements, supplying alternating current of constant frequency to the first element of each motor, and a current of varying frequency to the second element of the motor, but this general arrangement need not be strictly adhered to, inasmuch as other arrangements, differing therefrom, may be used with success, as will hereinafter be pointed out. The method of generation is such that the recurrent cycles of rising and falling frequency alternate with each other in the circuits by means of which the varying frequency currents are transmitted to the two groups of motors, one being at maximum frequency when the other is at the minimum.

For example, in using electric motors of the alternating current type, with distributed windings on both the stator and rotor, such as the wound-rotor type induction motor of commerce, we supply the rotor with electric current of approximately constant frequency from one circuit, and the stator with current of varying frequency from the other circuit. While the stators of the motors of one group of motors are supplied with current of varying frequency from one source, and the stators of the motors of the other group are supplied with current of varying frequency from a second source, the rotors of both groups of motors are supplied with current of constant frequency generated in a common and third source, but such third source is independent of the sources of the varying frequency currents, supplied to the motors of both groups.

In the operation of our invention, it follows that when the varying frequency current supplied to the stator of the motor is reduced to its minimum frequency, it will be equal to the constant frequency current supplied to the rotor, and the motor speed at this instant will be zero. The magnetic field of both rotor and stator are revolving at exactly the same speed and in the same direction, and therefore the motor stands still. Consequently, the machine operated from the motor will be locked in a fixed position, which will be maintained as long as the period of equal frequency continues. At this point, neither rotating magnetic field will gain nor lose on the other, since the two current frequencies are in unison. When, however, the frequency of the current in the stator is increased, the motor begins to rotate, and as the frequency rises to maximum, the motor attains its maximum speed. The machine driven by it is actuated in the semi-cycle of time allotted for the performance of its work. As the frequency of the current again subsides to its normal minimum, the motor speed decreases, the motor eventually assuming its position of rest, and these operations are repeated with each rising and falling of the varying frequency current. All of the motors in one group are actuated in synchronism, as will be understood, and in alternation with the motors of the other group, the motors of each group operating, as described, through substantially one half of the cycle of time covering the whole operation, and remaining at rest during the other half of such cycle.

We have described our invention as embodied in a system in which the motors of the two groups are operated at varying speeds in alternation. But our invention is likewise applicable to a single group of motors operating in cycles of rising and falling frequency, such motors driving machines which have periods of work alternating with periods of rest, as before. The motors of one group may be discontinued while the motors of the other group remain in operation.

Other forms in which our invention may be embodied, will be described hereinafter, and the claims in which are recited the novel features of our invention, will be found at the end of this specification.

In the drawings accompanying this specification,

Figure 1:
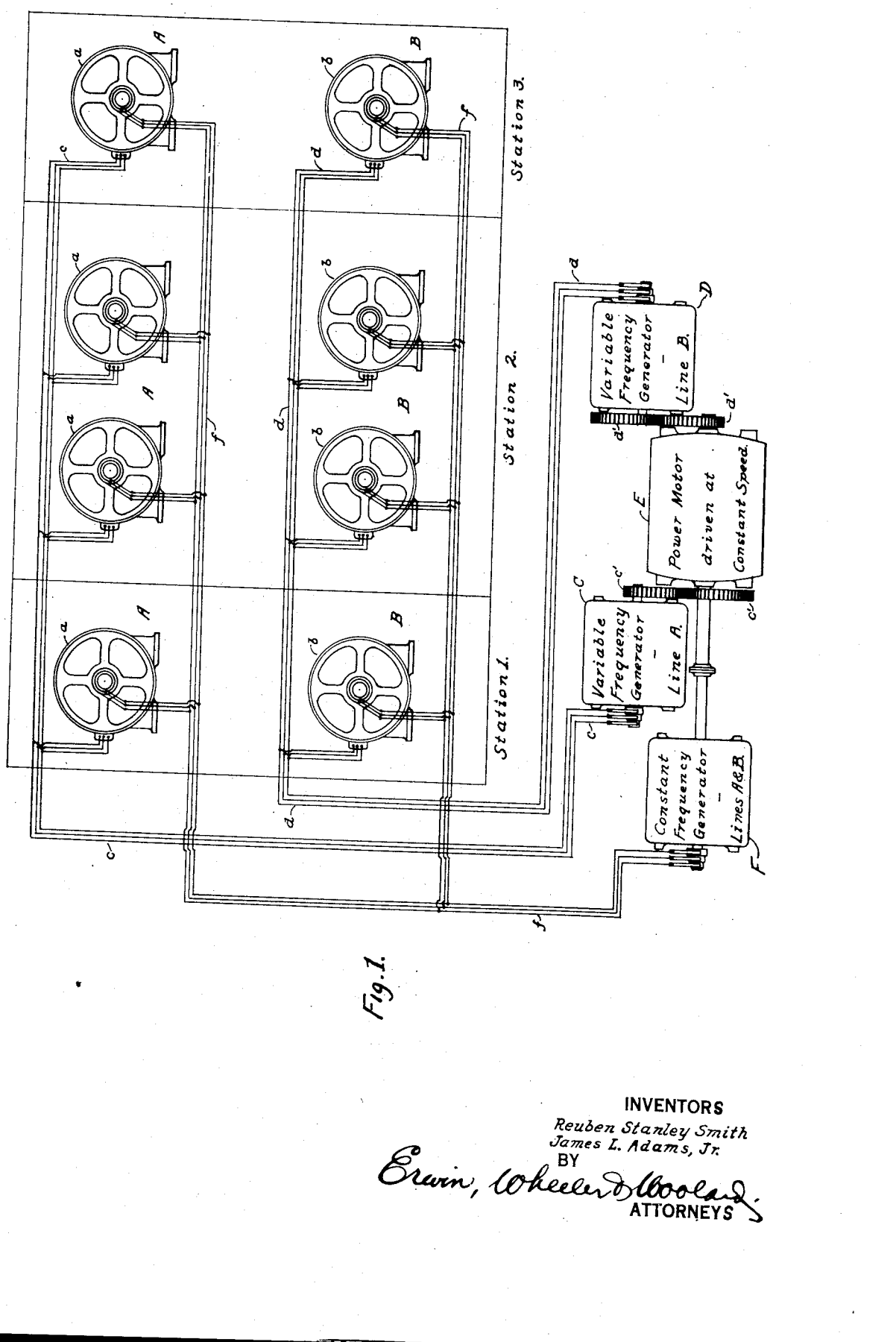
Figure 1, illustrates diagrammatically an assemblage such as is disclosed in the aforesaid patent, with the motors of each group and connections therefrom to the several generators, together with the power motor and irregular gearing between the said motor and the generators for producing currents of varying frequency, the gearing being shown in a merely conventional manner.

Referring to the drawings, in Figure 1 of which stations 1, 2 and 3, of the assemblage are shown for purposes of illustrating the arrangement, $a$ indicates the motors employed to drive the machines of the first line A, of the two lines of machines constituting the assemblage. The machines in line A, are the work machines, or those which perform the mechanical operations assigned to the respective stations. The motors $b$, of the second line B, drive the conveyor devices, which are employed to move the work from station to station, or from machine to machine at such stations as require more than one machine for the completion of the work assigned to that station, as at station No. 2, for example.

The motors $a$ and $b$, of the lines A and B, operate independently, intermittently and alternately, and when in action, operate at varying speeds, being supplied with current of varying frequency by the generators C and D, respectively, through the connections $c$ and $d$.

A driving motor or other primary power device, indicated E, operated at a constant speed, is coupled to the generators C and D, through the medium of intermeshing gears, so that both of the said generators are operated at speeds always under the control of the motor E. The gearing between the driving motor E, and the generators C and D, may be a train which will include co-operating eccentric or irregular very low speed gears $c'$ and $d'$, which will be of such contour as to impart periodic fast and slow movements to the generators in alternation with each other.

The generators C and D, are thus driven intermittingly at varying speeds, and currents of varying frequency are produced. These currents may have a normal minimum of 30 cycles, produced during the times when the generators are rotating at their lowest speeds. The frequency of the current will be increased to the maximum of 60 cycles, during the times when the generators are rotating at their highest speeds. The currents of varying frequency thus produced by the generators C and D, are fed to the motors of the lines or groups A and B, whereby such motors are operated at varying speeds ranging from zero during the period throughout which the motors are at rest, to a maximum during the succeeding work period wherein the motors attain their highest speed in the performance of the work which they are designed to accomplish.

In the present instance, the motors of each group are of the wound-rotor induction type, with distributed windings on the stator and rotor. One element, preferably but not necessarily the stator, of each of the motors of both groups is supplied with current of varying frequency from the generators C and D, respectively, as described.

One element, preferably but not necessarily the rotor, of each of the motors of both groups, is supplied with current of constant frequency from an independent source, which will now be described. In Figure 1 of the drawings, we have shown a generator F, as coupled to and driven by the shaft of the power motor E, the purpose of which generator is to furnish the current of constant frequency, above referred to. In the form illustrated, the generator F is driven in unison with the motor E, thus insuring that the said parts will operate always in the same timing. However, it is not necessary for the purposes of our invention, that the generator F, be driven from the motor E, by the direct connection described. The generator F may be driven independently of the motor E. Again, such generator may be dispensed with entirely, and a current of constant frequency may be conducted to the rotors of the motors $a$ and $b$, by any suitable transmission line from an outside or independent source.

The generators from which we obtain the three alternating currents are of usual type, and will be such as to deliver continuously currents of necessary constant and varying frequencies, as indicated. The speeds for the motors while in operation will be determined by dividing the difference in frequencies of the currents supplied to the two elements of the motors, as measured in alternations per minute, by the number of poles for which the motor is wound.

The current of constant frequency, which we supply to the rotors of the motors of both lines of the assemblage, should be equal to the minimum frequency of the current supplied to the stators of the said motors. At such periods as currents of equal frequency are flowing in the same direction into the two elements of the motors of both lines, the magnetic fields will rotate in unison, and the motors will come to a position of rest, as hereinbefore stated. The machines which are operated by the motors will likewise come to positions of rest, which will be maintained, so long as the magnetic fields of the stator and rotor continue to revolve at the same speed.

Figure 2:
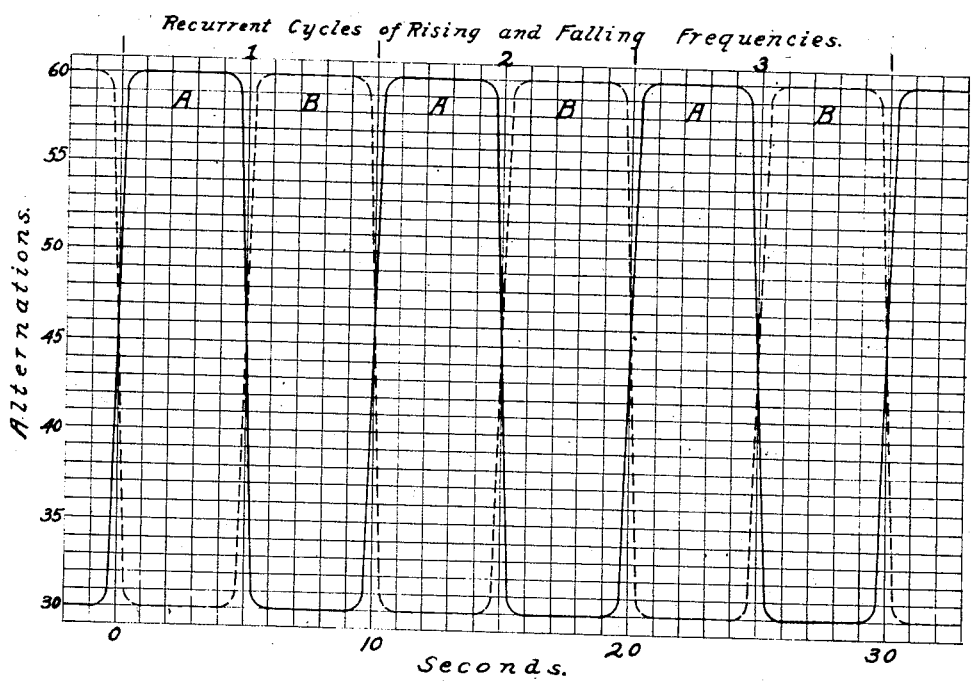
Figure 2, is a diagram showing by means of time-frequency curves, the relation of the varying frequency currents which we propose to use in our preferred arrangement illustrated in Figure 1.

Referring to the diagram, Figure 2, the range of the rising and falling frequencies of the currents which actuate the motors of lines or groups A and B of the assemblage, is shown. The normal or minimum frequency will be that of the constant frequency current, which in the present illustration, is established as a 30 cycle, alternating current. From this normal condition the varying frequency currents will rise to the maximum and recede to the normal, with each operation of the motors of the assemblage. In the illustration, a period of 10 seconds in time has been allowed for each recurrent rising and falling cycle, during which period each motor performs its work in a predetermined sub-division of such cycle, and remains at rest for a like sub-division of the cycle. As indicated by the time scale of the diagram, the transition from the minimum to the maximum of the two varying frequency currents, is accomplished in a fairly brief time. While we have shown in the said diagram, the recurrent cycles of rising and falling frequencies of both currents as in transition within the same time period, it is obvious that this operation is not a necessary one, and that the timing of the operation may be changed so that one current will descend to the normal just before the second one commences its rise, and vice versa.

Starting from any low frequency instant, as 0, 10, 20 or 30, in the time scale in Figure 2, or any other minimum frequency instant in which the frequencies of the two currents supplied to the motors $a$ coincide, it will be apparent that the speed of these motors will rise and fall rythmically, and that similarly the motors $b$ will in turn rise and fall in speed in alternation with the motors $a$. The motors $a$ and $b$, will maintain invariably the precise relations between their respective speeds. Under these conditions the motors of each group will act as synchronous motors, to the extent that they are forced to keep in exact step with the currents in both stator and rotor, with the result that the motors of both groups are at all times under the complete control of the generator, even down to a fraction of a revolution of the motor. This condition follows from the fact that the generators are each geared to the prime mover by suitably shaped irregular or eccentric gears, by means of which the fast and slow motions are alternately imparted to the generators. The speed which each of the motors will have, and the total number of revolutions which it will make in given cycle of operation, can easily be determined.

We have described our invention as embodied in a construction in which the motors have been separated into two lines or groups, such motors being fed with varying frequency currents preferably, but not necessarily, spaced in one-half cycle time or 180°, such motors functioning in regular alternation, each line or group in its appropriate half-cycle. But if desired, more than two lines or groups of motors may be employed, and varying frequency currents corresponding in number thereto may be supplied, the currents being spaced in one-third cycle time or 120°, or otherwise. Also, we may use a single line of motors, operating in cycles of rising and falling frequency, to drive machines which in a given cycle of time have periods of work alternating with the periods of rest. In our invention, one group of varying speed motors may be cut out and the operation of the other continued in certain classes of work. While we prefer to use poly-phase currents, we may use single phase currents, if desired.

Where two alternating current sources of different frequencies are connected to the two elements of the same motor, the power is taken from the higher frequency source, and a fraction of this power is returned to the lower frequency circuit, so that the motor output is the difference between these two. But where the higher frequency is three times that of the lower, or more, this loss in motor, line, and generator capacity reduces to the point where it is no longer a very serious matter, when compared with the advantages derived from this type of synchronous drive, especially throughout the lower motor speeds of operation. The method described permits the synchronous operation of the motor at nearly full-load torque down to and at zero speed.

Other modifications, within the scope of the appended claims, may be made without departing from the spirit of our invention. Other types of motors may be used, and direct current may be supplied to one of the elements if the motors be of the ordinary synchronous type, thus dispensing with the use of the lower constant frequency alternating current, previously described. But in all cases where such synchronous motors with direct current field excitation, are required to keep in absolute synchronism clear down to zero speed, difficulties are encountered both in the motors and in the generators, so that in such cases at least, we prefer to utilize the generator and motor constructions previously outlined herein, as being better adapted to such use.

In an application filed by us on October 20, 1919, Serial No. 331,824, we have shown our invention as applied to the synchronous operation of a group of motors at varying speed, a current of periodically varying frequency being generated and supplied to one element of the motors and a current of constant frequency to the other, as in the present case, and also the operation of a single motor in the same manner.

Having thus described our invention, what we claim and desire to secure by Letters Patent is:—

1. In an electric motor drive system, a plurality of groups of electric motors, in combination with means to generate and supply currents of varying frequency to the motors of the separate groups to operate such motors as groups synchronously at varying speeds, in alternation.

2. In an electric motor drive system, a plurality of groups of electric motors, in combination with separate generators to supply currents of varying frequency to the motors of the separate groups, to operate such motors as groups at varying speeds, in alternation.

3. In an electric motor drive system, a plurality of groups of electric motors, in combination with separate generators to supply currents of varying frequency to the motors of the separate groups, and operating means for the generators to drive the latter at varying speeds in timed alternation.

4. In an electric motor drive system, a plurality of groups of electric motors, in combination with a plurality of sources of varying frequency current supply, such sources being separately connected to the groups of motors to drive the latter as groups in alternation.

5. In an electric motor drive system, a plurality of groups of electric motors, the motors of one group operating independently, intermittingly and alternately with relation to the motors of the other group, in combination with a plurality of generators operating alternately to deliver currents of varying frequency to the respective groups of motors, to operate such groups of motors as described.

6. In an electric motor drive system, a plurality of groups of electric motors, the motors of one group operating independently, intermittingly and alternately with relation to the motors of the other group, in combination with a plurality of sources of varying frequency current supply for separately feeding the motors of the groups, in alternation, to operate such groups of motors as described.

7. In an electric motor drive system, the combination of a plurality of groups of electric motors, with a plurality of sources of currents of varying frequency, and means for connecting each current source to one of said motor groups, with means for energizing such sources alternately.

8. In an electric motor drive system, a plurality of groups of electric motors, a plurality of generators, means for separately connecting a generator to each motor group, and intermittingly acting driving means for the generators, which latter supply electric currents of varying frequency to the motors of each group.

9. In an electric motor drive system, a plurality of groups of electric motors, in combination with a corresponding plurality of sources of electric current of periodically varying frequency, connected respectively to the motor groups, with means for energizing such sources alternately.

10. In an electric motor drive system, a plurality of groups of electric motors, in combination with a plurality of means for producing electric currents of varying frequency, and connections between such means and the motor groups, with means for actuating said producing means alternately.

11. In an electric motor drive system, a plurality of groups of electric motors, in combination with a plurality of varying speed generators for producing electric currents of varying frequency, connections therefrom to the groups of motors, and common driving means for the generators.

12. In an electric motor drive system, a plurality of groups of electric motors, in combination with a corresponding plurality of sources of alternating currents of varying frequency, whose instants of maximum frequency do not coincide, and means for separately connecting the current sources to the motor groups.

13. In an electric motor drive system, a plurality of groups of electric motors, in combination with a separate source of alternating current of varying frequency connected to one element of the motors of each group, and a source of current of constant frequency connected to the other element of the motors of all groups.

14. In an electric motor drive system, a plurality of groups of electric motors, in combination with a plurality of separate sources of current of varying frequency for one element of the motors of each of the motor groups, together with an independent source of current for the other element of the motors of all groups, and connections between said current sources and the motor groups.

15. A system of electric distribution, comprising a power motor and generating means driven thereby to produce currents of varying frequency, in combination with groups of motors connected to the generating means and actuated thereby in timed alternation, with the motors of each group operated in synchronism.

16. A system of electric distribution, comprising a power motor and a plurality of generators driven thereby to produce currents of varying frequency, in combination with a plurality of groups of motors connected respectively with the generators and actuated thereby in timed alternation, with the motors of each group operated in synchronism.

17. A system of electric distribution, comprising a power motor and generating means driven thereby to produce currents of varying frequency, whose instants of maxima do not coincide in the separate groups of motors to which such currents are delivered, in combination with a plurality of groups of motors connected respectively with the generating means and actuated thereby in alternation as groups, with the motors of each group operated in synchronism.

18. A system of electric distribution, comprising a power motor and generators driven thereby to produce currents of varying frequency which are delivered to one element of the motors of a plurality of groups of motors, in combination with such groups of motors connected with and actuated by the generators in alternation, with the motors of each group operated in synchronism, and means for generating and delivering a current of constant frequency to the other element of each of the motors.

19. In an electric motor drive system, motors separately grouped, and means for supplying a current of constant frequency to one element of the motors of the several groups, in combination with means for supplying currents of varying frequency to the other element of the motors of the different groups in periods alternating with each other.

In testimony whereof, we have signed our names at Milwaukee, this 25th day of July, 1919.

R. STANLEY SMITH.
JAS. L. ADAMS, Jr.

Witnesses:
LILLIAN ROE,
W. F. WOOLARD.